United States Patent [19]

Perkins et al.

[11] Patent Number: 5,779,948

[45] Date of Patent: Jul. 14, 1998

[54] METHOD OF LINING A PIPELINE USING A CONSTANT EXTRUSION PRESSURE

[76] Inventors: Alfred G. Perkins, deceased, late of McCormick, S.C.; by Patricia R. Perkins, 196 Savannah Dr., McCormick, S.C. 29835

[21] Appl. No.: 613,851

[22] Filed: Mar. 11, 1996

[51] Int. Cl.$^6$ .............................. B32B 35/00; E04B 1/16; F16L 55/18
[52] U.S. Cl. .................. 264/35; 138/97; 264/36; 264/40.3; 264/40.5; 264/514; 264/573; 264/269
[58] Field of Search .................. 264/35, 36, 269, 264/40.1, 40.3, 40.5, 514, 573; 138/97

[56] References Cited

U.S. PATENT DOCUMENTS

| | | |
|---|---|---|
| 1,768,451 | 6/1930 | Hume . |
| 1,951,221 | 3/1934 | Tate ............................................. 25/38 |
| 2,293,365 | 8/1942 | Scott ............................................ 25/38 |
| 2,377,615 | 6/1945 | Crane ........................................... 25/38 |
| 3,041,204 | 6/1962 | Green . |
| 3,044,136 | 7/1962 | Perkins . |
| 3,108,012 | 10/1963 | Curtis . |
| 3,137,318 | 6/1964 | Maneri et al. . |
| 3,563,889 | 2/1971 | Cooper, IV et al. .................. 210/23 |
| 4,038,351 | 7/1977 | Koenst, Jr. et al. .................. 264/45.1 |
| 4,456,401 | 6/1984 | Williams . |
| 4,764,237 | 8/1988 | Shishkin et al. ........................ 156/294 |
| 5,230,842 | 7/1993 | Munde . |
| 5,246,641 | 9/1993 | Perkins et al. .......................... 264/35 |
| 5,447,664 | 9/1995 | Ito et al. . |
| 5,609,186 | 3/1997 | Satake et al. . |

OTHER PUBLICATIONS

"Continuous Inspection Needed to Tame Pipeline Corrosion," G. Congram, Pipeline and Gas Journal, vol. 221, Dec., 1994, at p.30.

"Economic Considerations in Pipe Line Corrosion Control," L. Sharpe, Corrosion, vol. 11, May, 1995, pp. 45–58.

Primary Examiner—Karen Aftergut
Attorney, Agent, or Firm—James C. Simmons

[57] ABSTRACT

A method and apparatus for quickly and inexpensively providing a constant extrusion pressure for pipeline lining with a mortar. A mandrel is inserted in a pipeline section with a slug of mortar ahead thereof. A pushing force is applied thereto to overcome resistance to movement thereof. A constant tension pull is applied to the mandrel to effect relatively constant but effective extrusion pressure between the mandrel and the pipeline wall for extrusion of mortar on the inner wall of the pipeline section.

12 Claims, 6 Drawing Sheets

METHOD OF LINING A PIPELINE USING A CONSTANT EXTRUSION PRESSURE

The present invention relates generally to the lining of pipelines in place with a mortar.

A commonly used method for lining pipelines in place in the water industry is the Perkins process wherein a centrifugal lining machine centrifugally projects cement mortar against the inside wall of a pipe while moving slowly through the pipeline. Such a process is described in U.S. Pat. No. 5,246,641 to Perkins et al, in which I am a joint inventor, and which patent is hereby incorporated herein by reference. Such a process has been very effective and can be used for pipelines which have many branches and other fittings.

Difficulties in supplying the machine with a continuous supply of mortar over distances beyond about 1000 feet from the supply source, the need for frequent access openings in the pipeline, and the slow lining speed, perhaps only about 4 to 10 feet per minute, make that method unattractive when the cost of time out-of-service is factored into the economic considerations. Since the use of the process is considered to be expensive compared to replacing oil transmission lines, the oil industry continues to deal with the many oil spills from corrosion holes on an individual basis as they occur. Sometimes, as a result, oil pipelines have been allowed to leak oil until such time as they are finally replaced. See, for example, "Continuous Inspection Needed to Tame Pipeline Corrosion," by G. Congram, *Pipeline and Gas Journal*, Dec., 1994, at page 30. See also "Economic Considerations in Pipe Line Corrosion Control," by L. Sharpe, *Corrosion*, vol. 11, May, 1995, pgs. 45–58.

Cement mortar lining is considered to effectively prevent internal corrosion of pipelines carrying sour crude oil and other corrosive fluids. In sour crude oil gathering systems in which internal corrosion is so severe that unlined steel pipe has to be replaced as frequently as perhaps every 1 to 1½ years, cement mortar-lined pipe has been in service with no leaks for more then 20 years.

U.S. Pat. No. 1,951,221 to Tate discloses the use of a mandrel to in effect "extrude" mortar onto a small bore pipeline wall. In the Tate process, a spreader is attached to a trailing float, and the assembly is pulled through the pipeline. As discussed in the third paragraph of U.S. Pat. No. 2,293,365 to Scott, the Tate lining undesirably has a flat bottom section caused by the deposit of excess water and fine sediment passing through dehydrating orifices in the spreader and out the end of the spreader skirt.

U.S. Pat. No. 2,377,615 to Crane discloses a series of mandrels of successively increasing diameters for "extruding" mortar onto a pipeline wall as they are dragged through the pipeline. The Crane process does not provide for control of extrusion pressure, thus also resulting in non-uniformity of mortar application.

U.S. Pat. No. 4,764,237 to Shishkin et al discloses the coating of the internal surface of a pipeline with a cement-sand mortar by use of a piston which is moved through the pipeline with the mortar fed ahead of it. Shishkin et al states that there are various means for moving the piston in the pipeline. One of these means is stated to be a pull rope. An alternative means is stated to be by the feeding of air to a turned-out portion of hose which is applied back of the piston. The Shishkin et al process also suffers from the deficiency of not providing for control of extrusion pressure thus also resulting in non-uniformity of mortar application. Shishkin et al further states that the hose aids in pressing the mortar layer to and holding it to the pipeline surface, which may be considered necessary to make the mortar stay in place when mortar application is non-uniform.

U.S. Pat. No. 2,293,365 to Scott discloses a method and apparatus for lining pipe with cementitious material wherein a charge of the material is placed ahead of lining apparatus in the form of a mandrel wherein lining material is forced between the mandrel and pipe wall to be "extruded" onto the pipe wall. Moisture is separated out of the mortar through dehydrating orifices in the skirt. However, this may require several thousand pounds of pull on the cable, and this undesirably leaves a build-up on the pipeline bottom. A mortar baffle is placed ahead of the mortar charge in frictional resistance with the pipe interior, provided by rubber rings. Thus, as the lining apparatus is pulled forwardly, the mortar charge and the mortar baffle are pulled forwardly with the mortar baffle providing the frictional resistance. It is said that this frictional resistance maintains the lining charge "at substantially constant pressure." However, it is apparent that the extrusion pressure will change as the lining charge decreases in volume while the lining apparatus is dragged forwardly, thus resulting in non-uniformity of motor application. Moreover, the amount of resistance afforded by the baffle due to, for example, diameter changes may change thereby introducing more non-uniformity of mortar application.

Other art which may be of interest includes U.S. Pat. Nos. 1,768,451; 3,563,889; and 4,038,351.

Figure 1:
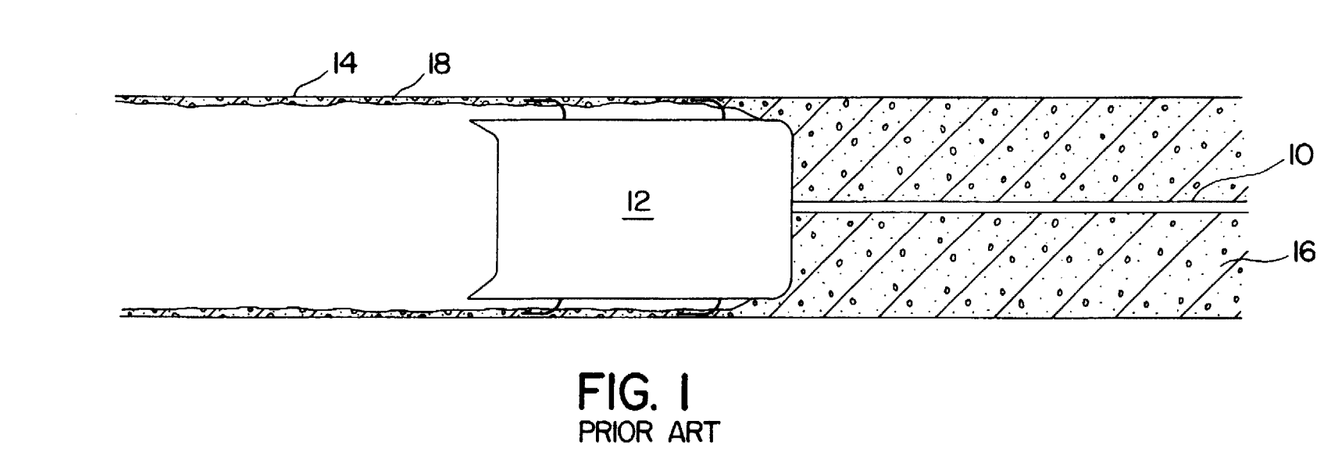
FIGS. 1 and 2 are schematic views which illustrate faulty extrusions of mortar onto a pipeline wall when using processes of the prior art.
Figure 2:
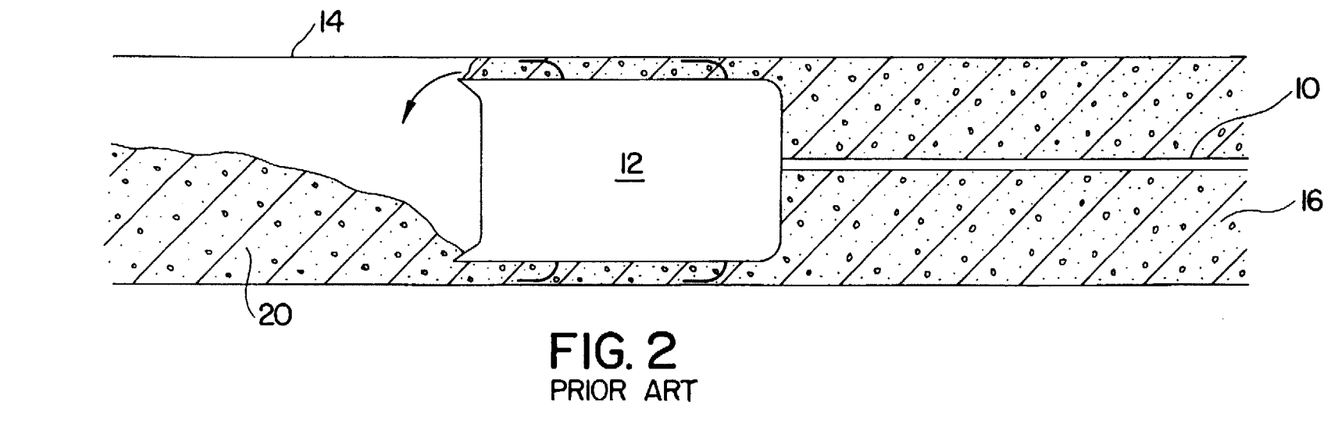

The processes described in the above "extrusion" patents do not adequately apply the mortar to the pipeline wall as uniformly as desired, as illustrated in FIGS. 1 and 2 wherein a wire rope 10 is shown pulling a mandrel 12 through a pipeline 14 with a slug 16 of mortar ahead of it to extrude the mortar onto the pipeline wall. If the tension on the wire rope 10 is inadequate or non-existent, a pressure applied to the rear of the mandrel to push it will move the entire mortar mass 16 and extrusion is not accomplished, as exemplified by the inadequate mortar application illustrated at 18 in FIG. 1. Where the tension on the wire rope 10 exceeds a critical limit, mortar is forced past the mandrel in excess quantity, a condition known as "blow-by," as exemplified by the build-up of mortar back of the mandrel as illustrated at 20 in FIG. 2. As a result, the Tate and other "extrusion" processes described hereinbefore are limited to runs of about 300 to 400 feet to escape blow-by.

The processes described in the above "extrusion" patents thus do not provide a means for maintaining a constant extrusion pressure across the mandrel (difference in pressure from front to back) in order to accomplish continuous, uniform extrusion, while other forces involved in the movement of hardware and materials through a pipeline vary over a wide range of values. The ability to prescribe and maintain a specific extrusion pressure is considered to be vital to the success of any extrusion method except in short lengths when all conditions are optimum.

It is accordingly an object of the present invention to uniformly extrude a layer of mortar on a pipeline wall.

It is another object of the present invention to achieve a rapid lining speed over longer runs.

In order to uniformly and rapidly provide an extrusion of mortar onto a pipeline wall, in accordance with the present invention, a variable force push is applied to the mandrel to overcome resistance to forward movement of the mandrel and mortar, and a constant tension pull is applied to the mandrel at the same time to provide, when working against the resisting force of the mortar, the optimum extrusion pressure to accomplish a continuous uniform lining.

The above and other objects, features, and advantages of the present invention will be apparent in the following detailed description of the preferred embodiments thereof when read in conjunction with the accompanying drawings wherein the same reference numerals denote the same or similar parts throughout the several views.

DETAILED DESCRIPTION OF THE PREFERRED EMBODIMENT

Referring to FIGS. 3 to 6, there is illustrated generally at 10 a pipeline which may be under the ground 11 and which is being lined on its inner wall 12 with a cement mortar lining, illustrated at 14. The pipeline 10 may, for example, be an oil transmission line which is relatively free of branch lines or fittings over long distances, i.e., more than a mile, for which the present invention is suitable. For this purpose, a pipeline segment 16 being lined is defined by portions removed therefrom at 18 and 20 to permit insertion of equipment and performance of procedures as hereinafter described. The length of the pipeline segment 16 may perhaps be about 1000 feet but may be as much as perhaps one mile or more. If necessary, a few branch lines may be cut and sealed off during the lining operation.

The use of a centrifugal lining machine is not only costly from the standpoint of required labor and equipment but also slow. In order to line the pipeline segment 16 at a suitably fast rate and less expensively, a slug, illustrated at 22, of cement mortar is introduced into one end, illustrated at 24, of the segment 16 by suitable means such as a conventional mortar or cement placement pump. This slug 22 contains the entire requirements for mortar in a given run, as calculated at the beginning of the run. It may of course be necessary to add more mortar near the end of the run. A conventional mixing machine may be used for providing the mortar. Suitable means for mixing and placement of the mortar in the pipeline section are described more specifically hereinafter. Introduced behind the mortar slug 22 is a flexible mandrel or form 26 composed of a rubber-like elastomeric material or other suitable material. The purpose of the mandrel 26 is to provide a moving form for the "extrusion" of mortar onto the pipeline wall 12, i.e., to effect the deposit of a selected lining thickness on a pipeline wall by the relative passage of the mortar between the mandrel and the pipeline wall. The diameter, illustrated at 28, of mandrel 26 is less than the pipeline inner diameter, illustrated at 30, by an amount which provides a clearance with the pipeline wall 12 which will provide the desired lining thickness, illustrated at 32. The mandrel 26 is guided by suitable centering means such as spring guides 34 circumferentially spaced as needed to hold it equidistant from the pipeline wall in the pipeline and to accommodate changes in pipe shape and diameter. The mandrel is suitably weighted to overcome buoyancy from its immersion in the mortar 22. For common cement mortars, the mandrel 26 may desirably weigh about 135 lbs. per cu. ft.

Figure 3:
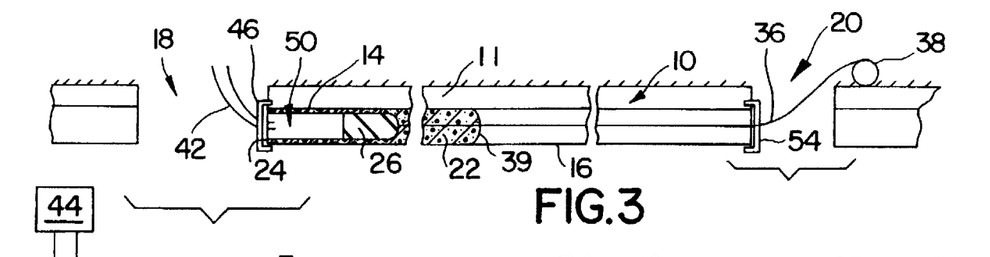
FIG. 3 is a schematic view illustrating the extrusion of mortar onto a pipeline wall in accordance with the present invention.
Figures 4, 5, 6:
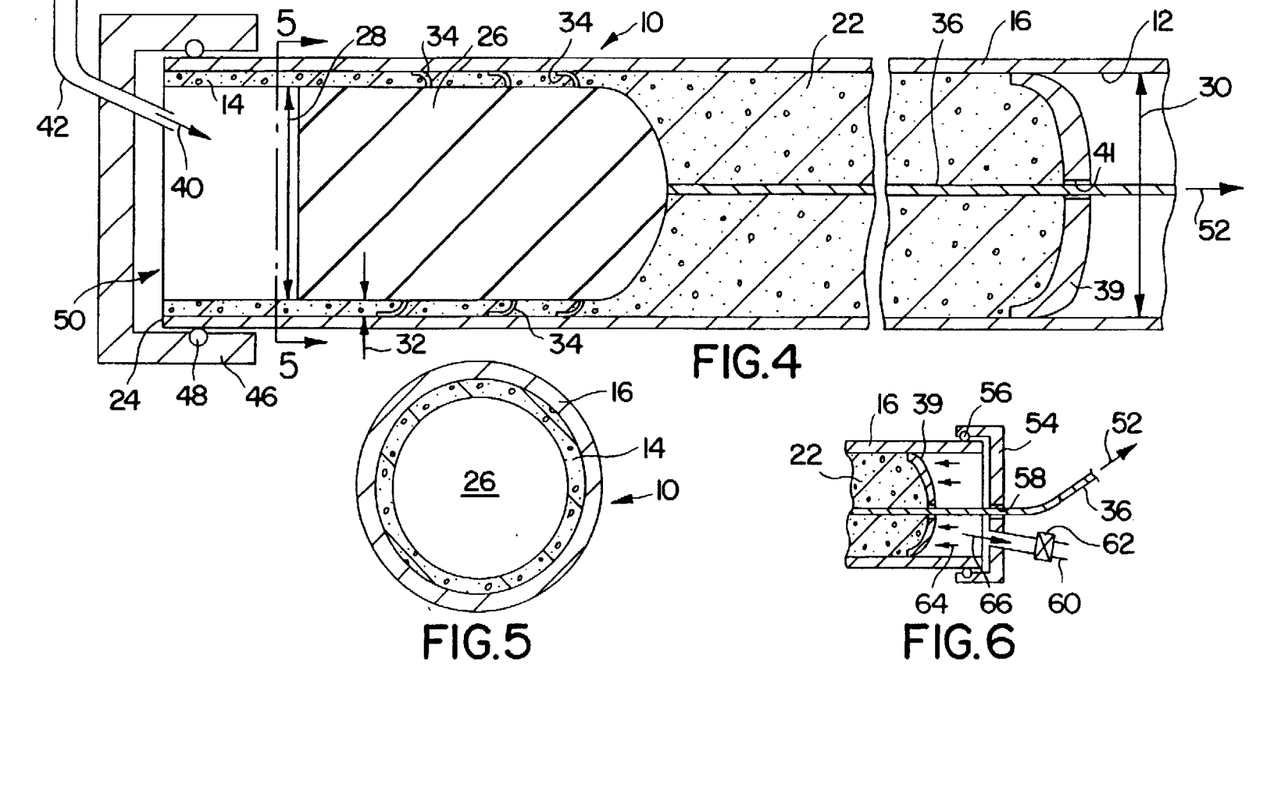
FIG. 4 is an enlarged partial schematic longitudinal sectional view of an end portion thereof where lining is begun.
FIG. 5 is a sectional view thereof taken along lines 5—5 of FIG. 4.
FIG. 6 is a view similar to that of FIG. 4 of the other end portion thereof with the lining operation nearing completion.

A wire rope 36 or other suitable cable is threaded through the pipeline segment 16 and suitably attached at one end to the forward end of the mandrel 26 and at its other end to a winch, illustrated at 38, the winch being located on the ground 11 and the wire rope 36 extending out the forward opening 20. The wire rope 36 may, for example, be a galvanized carbon steel aircraft cable marketed by Hanes Supply Co. of Buffalo, N.Y. The size thereof will depend upon the desired extrusion pressure and the pipeline diameter.

A free-floating containment baffle or squeegee 39 may, if desired, be provided ahead of the mortar slug 22 to be pushed along by movement of the slug 22 to resist forward movement thereby holding the lining material in a body. An aperture, illustrated at 41, is provided centrally of the baffle 39 to receive the cable 36 so that the cable 36 can move relative to the baffle 39.

If the force applied to the mandrel 26 by the cable 36 relative to the mortar is insufficient, adequate extrusion will not occur, as illustrated in FIG. 1. If the force is too great, blow-by will occur, as illustrated in FIG. 2. In order to apply the lining 14 without the effects of inadequate extrusion or blow-by, in accordance with the present invention a specific optimum tension is applied to the cable 36 for the mandrel which, when pressing against the resisting mortar ahead of the mandrel, will create the proper pressure so that the mortar will move relative to the circumferential outer surface of the mandrel but will remain stationary with respect to the pipe wall. This tension relates to the requirements of proper extrusion and is unrelated to the force requirements for movement of the mortar and mandrel through the pipe. The tension is applied as a constant tension pull, illustrated at 52, to cable 36 so as to uniformly achieve the desired extrusion pressure throughout the run, which may be over a mile.

In order to accomplish the movement of mortar and the mandrel through the pipe, also in accordance with the present invention a pressure is applied, as illustrated at 40, in back of the mandrel 26 in order to move or push the slug 22 as well as the mandrel 26 through the length of the pipeline segment 16. The pressure 40, which may be air pressure, carbon dioxide pressure, or other suitable fluid pressure may be provided through a conduit 42 which is connected to a pressure source, illustrated at 44, which may be, for example, a conventional air compressor. Initially, perhaps about 3000 cu. ft./min. of atmospheric air brought to a pressure of perhaps only about 24 psig may be required. A sealing cap 46 including an o-ring 48 is provided on the rearward portion of the segment 16 for sealing of the space, illustrated at 50, to the rear of the mandrel 26. The magnitude of the pressure 40 is whatever is required on addition to that provided by the pull of the cable to overcome the resistance of the slug. The force required to push the slug and mandrel will decrease as the amount of mortar in the slug decreases. The pressure 40 may thus be adjusted to achieve the desired force as the slug resistance to movement decreases, i.e., this pressure is applied to regulate the mandrel speed.

The provision of the pressure 40 alone would not achieve relative movement between the mandrel and mortar for extrusion, the result being the condition illustrated in FIG. 1. In order to provide relative movement between the mandrel and mortar for extrusion, the previously described pulling force 52 is applied to the mandrel through the wire rope 36. This pulling force 52 is applied to achieve a predetermined constant tension pull to the mandrel 26, as described more fully hereinafter, so that an effective extrusion pressure between the mandrel 26 and pipeline wall 12 may be achieved. Thus, the entire mass (mandrel and mortar) moves forward while the mandrel moves slowly forward relative to the slug of mortar at a predetermined constant rate even as the slug mass is gradually reduced by the quantity of mortar left behind as lining.

As used herein and in the claims, "constant tension" is meant to refer to a specific tension which is selected to be suitable for a given set of circumstances, the pull applied to the cable being regulated to maintain that selected specific tension as long as the conditions remain the same. Thus, if the conditions change during a run, a different tension may be selected, which is thereafter maintained relatively constant. For example, if the mandrel encounters a stiffer portion of mortar, the tension to be maintained constant may be increased. The value of the constant tension to be maintained may be adjusted by observing recently-applied lining, as hereinafter described.

For example, for a 30 inch inside diameter pipeline, the mandrel may have a diameter of perhaps about 29¼ inches to apply a lining thickness 32 of about ⅜ inch. The pipeline section, which may have a length of perhaps about 5000 feet, may be charged with a mortar slug having a length of perhaps about 250 feet. The initially applied pressure 40 may be on the order of 31 psig, and a constant tension 52 of perhaps about 3700 pounds force may be applied, which can be handled by a ¼ inch galvanized steel aircraft cable having a usable strength of 8200 pounds and weighing perhaps about 135 pounds per 1000 feet. If the length of run were doubled, the volume of mortar required would be approximately doubled, requiring the initially applied pressure to be doubled, but the applied tension would remain substantially at about 3700 pounds force. A pressure of 62 psig is within the maximum pressure which could be considered for normal use in transmission pipelines.

In the above example, 5000 feet of cable would weigh perhaps about 675 pounds. Assuming a friction factor of 0.25, the pull on the cable would decrease by only about 170 pounds throughout the 5000 foot run, which is considered to be within practical acceptable tolerance. Thus, it may not be necessary to modify the applied constant tension 52 during a run.

As the mandrel 26 moves forwardly with the slug 22, it is pushed by the pressure 40 acting thereon. It is also pulled by means of the small wire rope 36. The cable 36 will be pulled so as to achieve the extrusion pressure needed to accomplish the extrusion of the lining mortar on the pipeline wall. The tension 52 on the cable 36 is desirably determined, in accordance with principles commonly known to those of ordinary skill in the art to which this invention pertains, to be such as to provide approximately half of that pressure which would be required to extrude mortar past the mandrel with the mandrel held stationary. As previously discussed, this tension may be adjusted by observing the condition of lining recently applied, and the cable pulled to maintain this same tension until another operating tension is selected due to a change in circumstances or further observation of recently-applied lining. Thus, the entire mass (mortar and mandrel) moves forward while the mandrel moves forward with respect to the slug. The force provided by the pressure 40 will decrease as the volume of mortar is consumed and therefore as its resistance to movement decreases, while the pulling force 52 on the mandrel remains constant in keeping with the extrusion pressure required to effect the lining.

Referring to FIG. 6, as the mortar is consumed, the pressure 40 is reduced until, at perhaps at about 80 percent of the lining run, it may reach a value of zero. At this point, the resisting pressure of the slug of mortar equals the reactive pressure created by the constant tension of the cable pulling the mandrel. At this time, in order to provide a force which will supplement the resistance to mortar movement so that the extrusion force will have a pressure equal to it to react against in order to maintain the required extrusion pressure, the escape of air at the pipeline end where the lining procedure is to terminate is restricted by providing thereon a cap 54 which is sealingly attached by o-ring 56 or other suitable means. The cap 54 has an aperture, illustrated at 58, through which cable 36 passes. An air outlet line 60 having a throttling valve 62 is provided in the cap 54 to control the rate at which air is allowed to escape, as illustrated at 66, from the pipeline section as the mandrel and remaining mortar advance so as to regulate the supplemental pressure, illustrated at 64, needed at any given time. This pressure 64 is desirably regulated to achieve the desired rate of travel of the mandrel. Alternatively, an amount of mortar in excess of the amount to be consumed in providing the lining thickness 32 may be provided in the mortar slug 22 to provide enough back pressure to keep the system working, applying lining, at the end of the section 16. This excess mortar may be re-used in a subsequent lining run. If needed near the end of a run, additional mortar may be pumped in through a hole in the pipeline. The entire lining operation can be stopped for a short period of time while the additional mortar is added.

Figure 7:
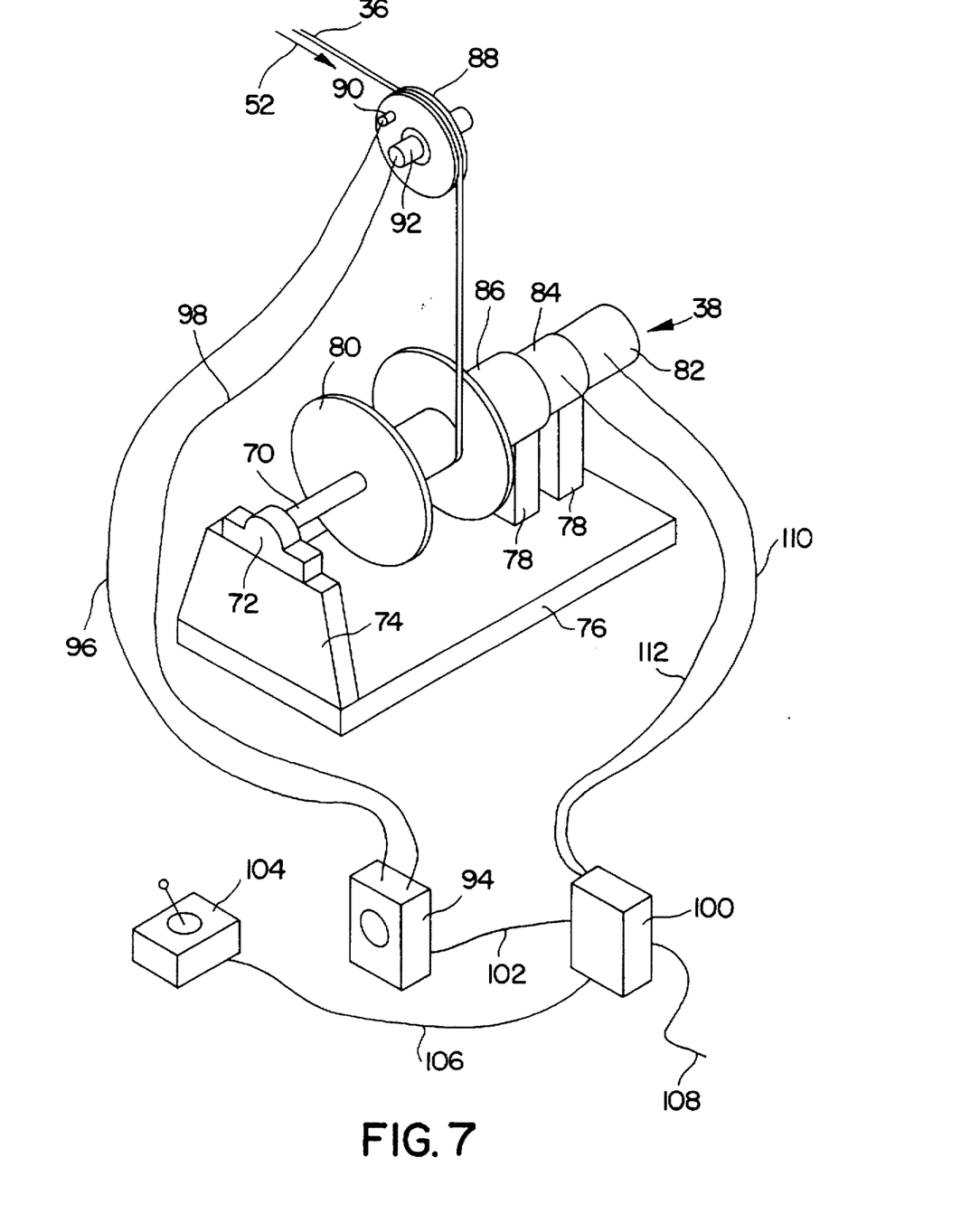
FIG. 7 is a schematic perspective view of apparatus for maintaining a specific tension upon the mandrel used in the process.

A preferred winch apparatus 38 for providing constant tension by cable 36 on the mandrel is illustrated in FIG. 7. The winch apparatus 38 includes a first shaft 70 rotatably mounted at one end in bearing 72 which is supported by support member 74 on support slab 76. Attached to the shaft 70 for rotation therewith is a spool 80 upon which the cable 36 is wound during movement of the mandrel through the pipeline section. An A.C. motor 82, which may be a squirrel cage induction motor, is mounted on another shaft (not shown) for effecting rotation of the shaft 70 via an eddy current drive 84 and gearbox 86, which are supported by supports 78 on slab 76. The shafts are coupled in eddy current drive 84 for rotation of shaft 70. The spool 80 may be alternatively roller chain driven.

A sheave 88 is rotatably mounted in accordance with principles commonly known to those of ordinary skill in the art to which this invention pertains to receive cable 36 prior to its passage to wind-up spool 80 for measurements of cable length wound-in by means of footage counter 90 and of load by means of load measuring pin 92. A suitable sheave with a load pin and footage counter may be obtained from M/D Totco Instrumentation (successor to Metrox Inc. of San Diego, Calif.) of 1200 Cypress Creek Road, Cedar Park, Tex. 78613, and is cataloged at pages 10 and 26 of its 1993 catalog no. 100. A suitable eddy current drive may be a 5 horsepower model AT-180 sold by Eaton Corporation, Electric Drives Division, 3122 14th Avenue, Kenosha, Wis. 53141. A suitable gearbox may be a frame size R80 foot mounted parallel (helical) reducer sold by Eurodrive Corp. of Lyman, S.C.

Measurements of footage and load are inputted via lines 96 and 98 respectively to a line tension and cable footage signal conditioner, illustrated at 94, which suitably processes the inputs and provides an output via line 102 to a programmable controller, illustrated at 100, which is operated by a suitable control lever, illustrated at 104, via line 106. The controller 100 is powered by an A.C. electric power input line 108. Utilizing the signals of load and footage as feedback, the controller 100 controls the motor 82 and eddy current drive 84 to maintain tension 52 on cable 36 via signals along lines 110 and 112 respectively. A suitable signal conditioner is also sold by M/D Totco Instrumentation. D.C. control input is provided via line 112 to slip rings (not shown) in the eddy current drive 84 to provide a magnetic flux which passes through a cup (not shown) of high hysteresis material connected to shaft 70 to create a drag which is proportional to the flux which is in turn proportional to current from the controller 100 to regulate the rotational torque of shaft 70 based on the sensed load feedback from load pin 92. Such an eddy current drive is well known in the art and therefore will not be described further.

It is not constant tension at the winch but constant tension at the mandrel that is desired, and the drag of the cable, which varies with length, affects tension at the mandrel. The length of the cable 36 as reeled in on the spool 80 is sensed by the footage counter 90 and programmed into controller 100, as previously discussed, and the tension applied to the cable 36, as determined by controller 100, is increased by perhaps about 4.5 percent to compensate for the friction drag of the cable 36, which is proportional to the length of cable reeled in and can be determined using principles commonly known to those of ordinary skill in the art to which this invention pertains.

Figure 12:
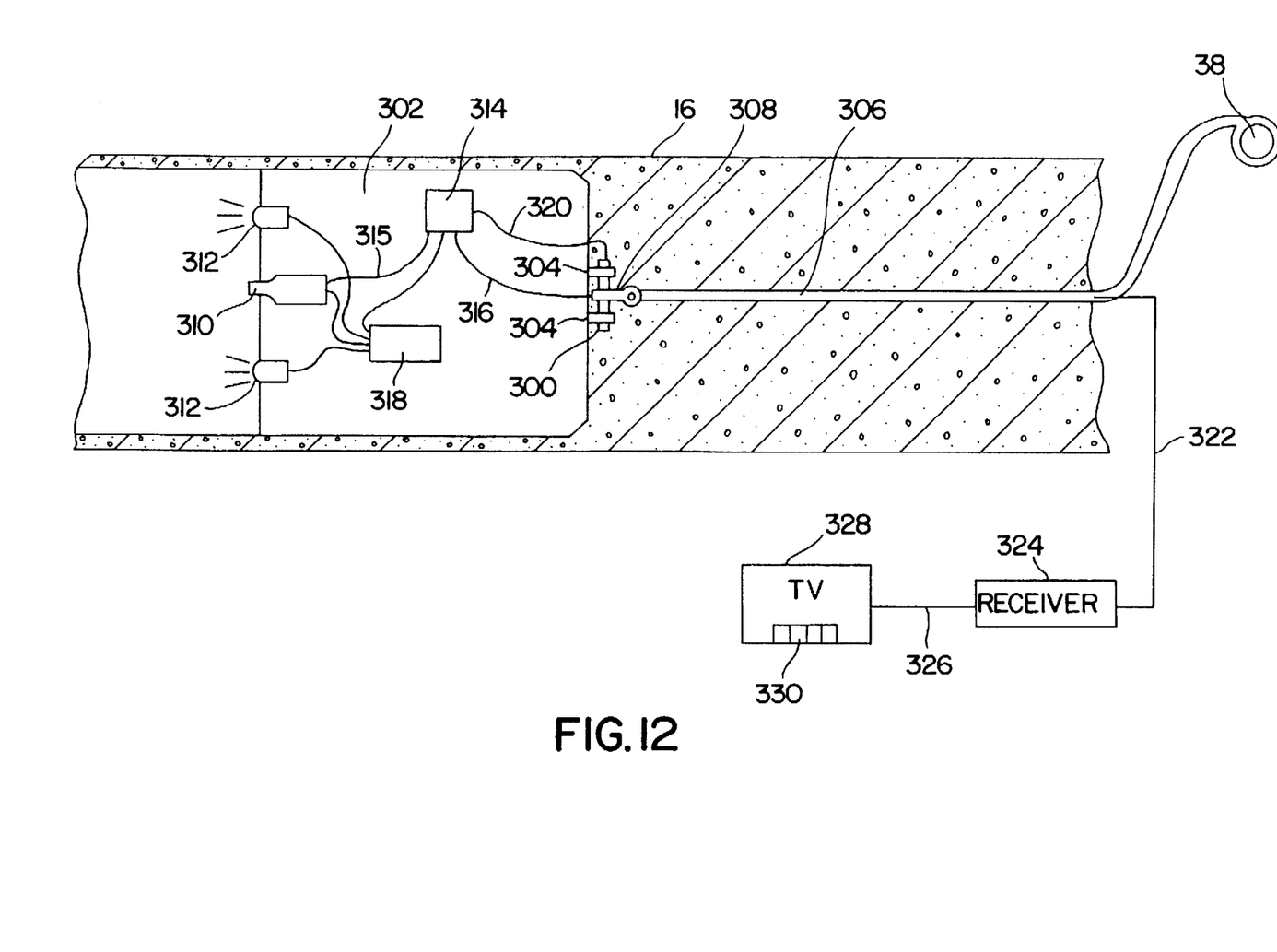
FIG. 12 is a view similar to that of FIG. 4 in accordance with an alternative embodiment of the present invention.

Referring to FIG. 12, there is illustrated an alternative embodiment wherein a load pin 300 is suitably attached to a mandrel 302, which may be similar to mandrel 26, as by brackets 304, and a cable 306, which may be similar to cable 36, attached as by bracket 308. This allows the tension at the mandrel 302 to be directly measured.

In order to provide visualization of the condition of recently-applied mortar on the pipeline wall so that the amount of constant tension to be applied to the cable 306 may desirably be adjusted, a suitable closed circuit TV camera, illustrated at 310, may be provided to face rearwardly from the mandrel 302 along with suitable lights, illustrated at 312. The TV signal provided by the camera 310 is fed to a suitable converter-transmitter, illustrated at 314, via line 315, wherein the TV signal is converted to optic signals which can suitably traverse the long distances (over a mile) to a TV monitor at the location of the winch. The television camera 310, lights 312, and converter-transmitter 314 are suitably powered such as by the battery, illustrated at 318. The optic signals are fed over fiber optic cable, illustrated at 316, along with cable 306 to and out the winch-end (far end) of the pipeline section. Signals from the load pin 300 are fed to the converter-transmitter via line 320 for conversion to optic signals and transmission also over fiber optic cable 316. A suitable converter-transmitter 314 may, for example, be one called a series 120V converter-transmitter provided by Fiber Options of Bohemia, N.Y.

After outlet from the pipeline section, the signals on fiber optic cable 316 may be axially transferred to fiber optic cable 322, utilizing principles commonly known to those of ordinary skill in the art, for delivery to a suitable optic receiver, illustrated at 324, which provides signals via line 326 to a suitable TV monitor, illustrated at 328, for viewing recently applied lining back of the mandrel and to a suitable digital readout device, illustrated at 330, for providing a digital readout of tensile load from load pin 300 along with any other informative data as may be desired. A suitable optic receiver 324 may, for example, be one called a series 120V optic receiver also provided by Fiber Options. Suitable fiber optic cable (FODI grade 225442) as well as suitable Amphenol fiber connectors (identified by no. 953-101-5010) therefor may be provided by Belden Wire & Cable Company. Suitable set-up of the load pin and T.V. equipment may be made using principles commonly known to those of ordinary skill in the art.

Figure 8:
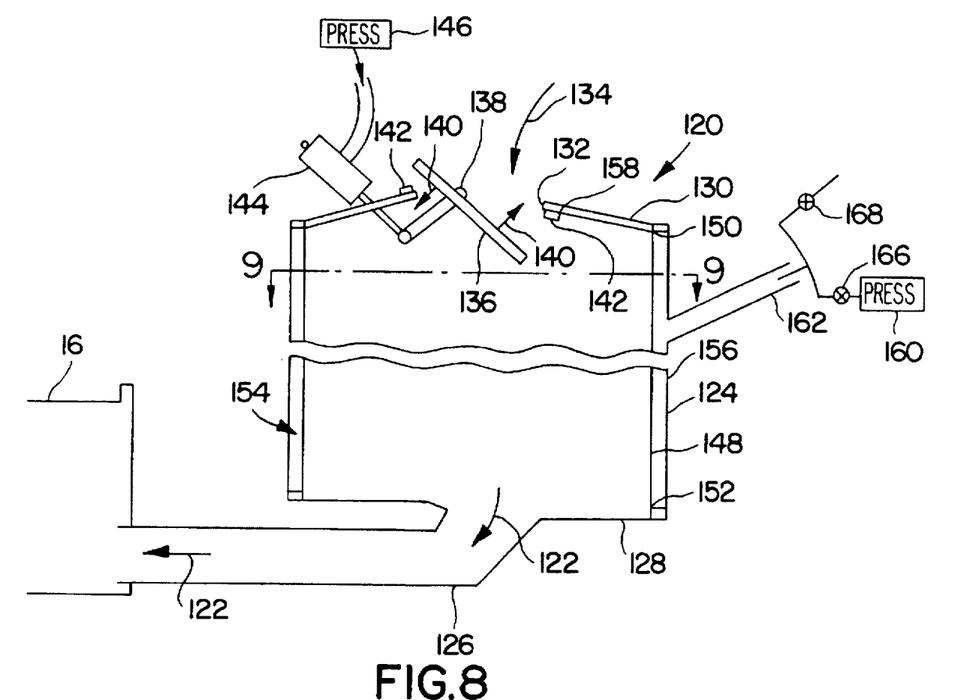
FIG. 8 is a schematic view illustrating apparatus for charging mortar into the pipeline.
Figures 9, 10:
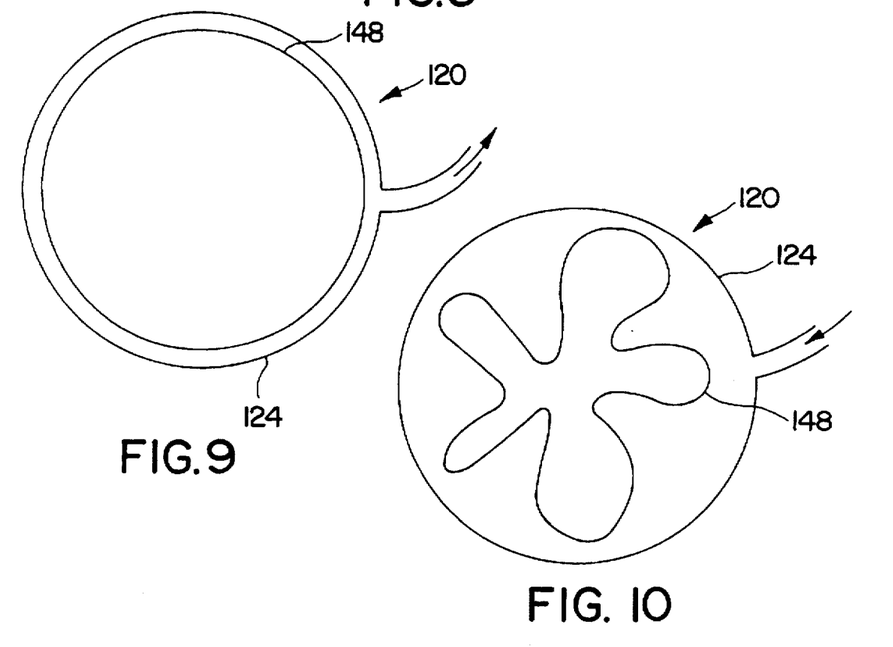
FIG. 9 is a schematic view thereof taken along lines 9—9 of FIG. 8 and illustrating the apparatus in a condition for receiving mortar.
FIG. 10 is a schematic view thereof taken along lines 9—9 of FIG. 8 and illustrating the discharging of mortar into the pipeline.

The consistency of the mortar is such that it may not flow easily into the pipeline but requires a force to effect delivery. Referring to FIGS. 8, 9, and 10, there is illustrated generally at 120 one type of apparatus which is considered suitable for charging mortar into the pipeline 16, as illustrated at 122. It should however be understood that any other suitable means for charging mortar may be employed, such as a mobile pump as typically used in the building trades for the placement of mortar, and such other means are meant to come within the present invention. The apparatus 120 includes an air-impervious rigid cylindrical body 124 capable of withstanding the pressure to which it is to be subjected. An outlet conduit 126 is connected to the bottom wall 128 of the cylindrical body 124, preferably centrally thereof, in flow communication with the interior of the body 124 for flowing mortar therefrom into the pipeline 16, as illustrated at 122. The upper wall 130 of body 124 has an opening, illustrated at 132, preferably centrally thereof, for receiving the mortar from a suitable mixer (not shown), as illustrated at 134. A suitable mixer for this purpose is a continuous mortar mixer designated for high volume such as provided by Cemen Tech, Inc., of Indianola, Iowa. However, any of various conventional concrete mixing and pumping apparatus would be considered suitable. A suitable door or valve 136 is provided for closing the opening 132 by its movement about fixed pivot 138, as illustrated at 140, to engage a suitable sealing means, illustrated at 142, around the perimeter of the opening 132. An air piston 144, connected to a source 146 of air pressure, is connected to the door 136 for operation thereof between the open position to receive mortar, as illustrated at 134, and the closed position for delivery of mortar into the pipeline 16, as illustrated at 122.

An air-impervious generally cylindrical flexible membrane enclosure 148 is provided inside the body 124 and anchored thereto at the top and bottom, as illustrated at 150 and 152 respectively, but free of attachment thereto otherwise along the height thereof, leaving an annular space, illustrated at 154, between the membrane 148 and cylindrical wall 156 of body 124 and leaving a bottom opening in flow communication with the conduit 126. The upper end 158 of the membrane 148 may be attached to body 124 adjacent the opening 132.

With the door 136 open, mortar is poured into the opening 132 to be contained within the uncollapsed membrane 148, as illustrated in FIG. 9. After a suitable quantity of mortar is poured therein, the door 136 is sealingly closed by operation of air piston 144. It may require a pressure of perhaps 35 to 40 psig to force the mortar into the pipeline. Such a pressure is supplied from source 160 into body inlet line 162 which is in flow communication with the annulus 154. This causes collapse inwardly of the membrane 148, as illustrated in FIG. 10, forcing the mortar into the pipeline 16, as illustrated at 122. When this has been completed, line 162 is vented and the door 136 is opened for receiving another quantity of mortar, the membrane 148 expanding to the condition illustrated in FIG. 9. Valves 166 and 168 are provided for alternating the connection of line 162 with the pressure source 160 and to vent respectively. If needed, a vacuum may be applied to the vent line. This cycle is repeated until a full charge 22 is received in the pipeline 16.

Figure 11:
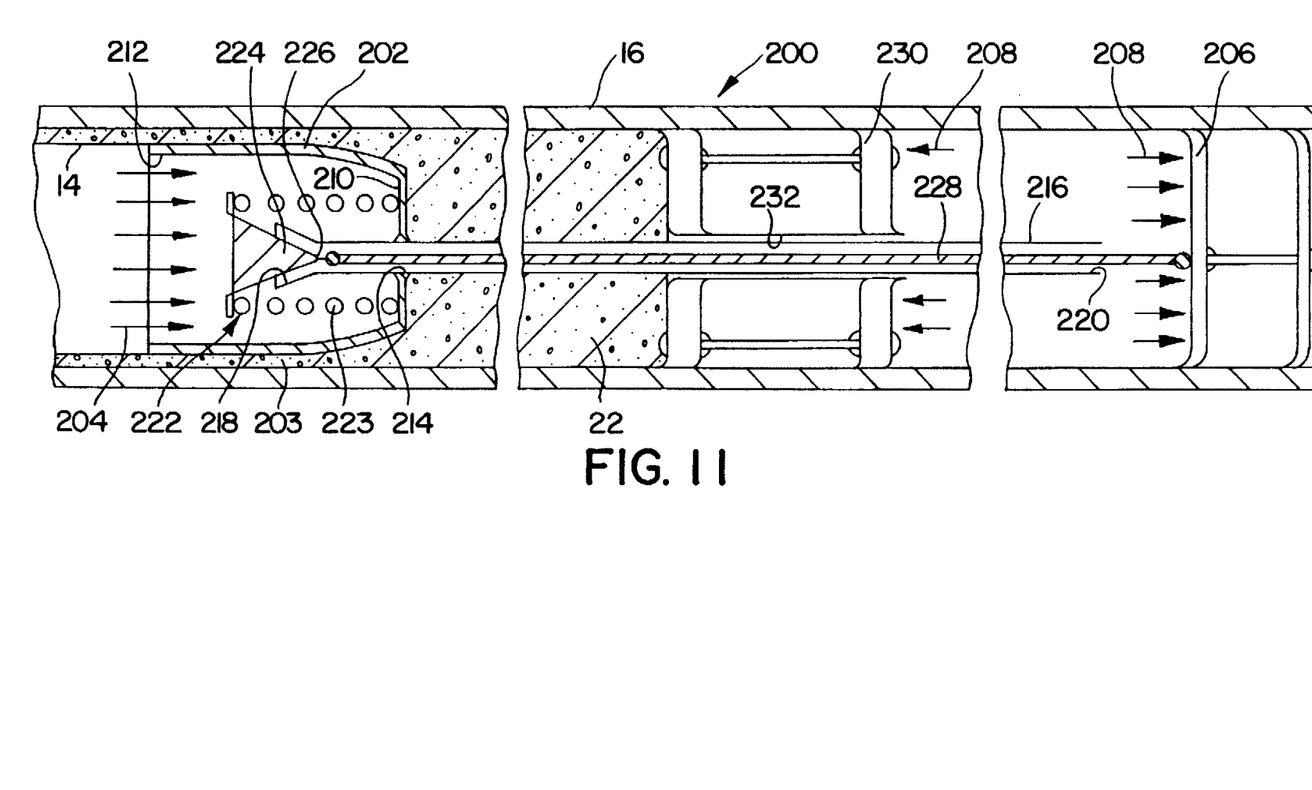
FIG. 11 is a schematic sectional view illustrating the extrusion of mortar onto a pipeline wall in accordance with an alternative embodiment of the present invention.

Referring to FIG. 11, there is illustrated generally at 200 lining apparatus in accordance with an alternative embodiment of the present invention wherein a constant tension pull on mandrel 202 is supplied by the pressure, illustrated at 204, acting to push the mandrel 202 as well as the slug of mortar through the pipeline 16 and also acting on a pull swab 206, as illustrated at 208, to supply the pulling force.

Mandrel 202, which has centering guides 203, is constructed to be a flexible mandrel but, if desired, may be rigid, and it has a hollow interior with a forward wall 210 and a rearward opening, illustrated at 212. Pressure 204 acts on the forward wall 210 as well as the mortar 22 to move the mandrel 202 and slug of mortar 22 forwardly.

Extending through an opening, illustrated at 214, in the forward wall 210 is a conduit 216 which has a rearward flared opening 218, which forms a valve seat, and a forward opening 220. An adjustable valve 222 having a compression spring, illustrated at 223, which is biased to hold valve 222 open and which is suitably adjustable for yielding force, is attached to the forward wall 210 and extends rearwardly therefrom. A valve plug 224 is suitably connected to and extends forwardly from the rearward end of the spring 223. A cable 228 is connected to the valve plug 226 at its forward end, extends through conduit 216 and out the forward opening 220 thereof, and is connected to pull swab or baffle 206 which is sealingly engaged to the pipeline wall for movement therealong. Pressurized fluid 204, in addition to applying pushing force to the mandrel 202 and mortar 22, also flows through the valve opening at 218 (when valve 222 is open), through the conduit 216 and out its forward opening 220, and applies force 208 to pull swab 206. This effects movement of the pull swab 206 forwardly and applies a pulling force on cable 228 to pull mandrel 202 forwardly relative to the mortar 22.

A mortar separator or baffle 230, similarly to baffle 39 in the embodiment of FIGS. 3 to 6, is freely slidable or movable on conduit 216 in that conduit 216 is received in an opening, illustrated at 232, which extends through the baffle 230, the baffle 230 serving to contain the mortar mass. Pressure 208 not only acts on the rearward side of swab 206 but also acts on the forward side of baffle 230 to apply force rearwardly on the mortar slug 22 thereby effecting a net pulling force on the mandrel 202.

The pulling force 208 is self-regulating so that a predetermined constant tension may be applied to the mandrel 202 for pulling thereof relative to the mortar. Thus, if pulling force 208 becomes too great, the pull on the cable 228 will compress the spring 223 to thereby effect forward movement of the valve plug 226 to seat against the conduit opening 218 to partially or fully close the valve 222 in which event the pulling force 208 is reduced. If the pulling force 208 is reduced too much, the valve 222 will open more to increase the pulling force. The tension of the spring 223 may be adjusted in accordance with principles commonly known to those of ordinary skill in the art to which this invention pertains to achieve the desired pulling force 208.

Utilizing the previously described apparatus, a suitable pipeline lining may be applied in accordance with the present invention as follows. The entire pipeline is first emptied of oil products, then descaled and cleaned of residual oil residue by conventional methods, i.e., such as by forcing wire brush scrubbers followed by squeegees through the length of the pipeline by fluid pressure. A section of pipe (having a length of perhaps about 3 or 4 diameters) is removed at the extremities of a pipeline section to be lined, a section of perhaps about 5000 to 10,000 feet in length. The winch 38 which will provide the controlled tension pull for the mandrel is provided at the far (forward) end of the lining run. The wire rope along with any information feedback cables (fiber optic cables 322) which may be used is threaded through the section of pipeline to be lined using conventional means.

With the winch cable along with its incorporated control conduits, i.e., fiber optic cables, isolated for late attachment to the mandrel, premixed cement mortar of suitable consistency and quantity is introduced into the near (aft) end of the pipeline section. The consistency will be based on pipeline diameter and lining thickness, using principles commonly known to those of ordinary skill in the art to which this invention pertains. The quantity of mortar required would be somewhat greater than $\pi dtL$, where d is the pipeline inner diameter, t is the lining thickness, and L is the length of the pipeline section to be lined. The mortar is mixed from water and dry ingredients, desirably using a high volume commercially available continuous discharge mortar mixer such as the Cemen Tech, Inc. mixer previously described. The mortar may be forced into the rear end of the pipeline section using the apparatus previously described with reference to FIGS. 8, 9, and 10. Alternatively, the mortar may be forced into the pipeline section by use of a high volume concrete pump conventionally used for rapid replacement of concrete at elevated levels from ready-mix trucks or by other suitable means.

Once a suitable amount of mortar is charged in the pipeline section, the mortar pump and mixer are shut down, and the mandrel (which is outside the pipeline section) is attached to its pulling cable and control conduits. A radio signal is given to the winch operator whereupon tension is applied to the cable, causing the mandrel to move into the rear pipeline section end and to the slug of mortar. It will then stop because there will not be enough tension on the cable to create a pressure sufficient for moving the slug of mortar forward or to create blow-by.

With the mandrel and slug of mortar therein, the near end of the pipeline section is then capped off with the preconstructed device; i.e., cap 46, which seals the near end of the pipeline section from air escape while providing for the introduction of air from the high volume air pump 44. The cap 46 is attached so as to be suitably braced against the reaction force of the air pressure 40, utilizing principles commonly known to those of ordinary skill in the art to which this invention pertains.

Pressurized air 40 is now introduced through the sealed bulkhead 46 behind the mandrel by means of the air pump 44. The air is pumped at whatever pressure is required to overcome resistance to movement of the mandrel and slug of mortar. This resistance to movement will not normally vary substantially over short distances but will reduce gradually as the lining operation progresses. Once movement is established, the rate of travel is determined by the rate at which air is introduced at the required pressure. The pulling winch is operated to provide a continuous proper tension (constant tension, as previously defined) at whatever the rate of travel of the mandrel.

As mortar is consumed (left behind on the pipeline wall as lining), the resistance to movement will require less and less air pressure from the pump 44. The volume of air introduced per period of time will remain substantially constant with the result that the winch pulling speed will remain substantially constant. The resistance to movement is overcome by the sum total of the controlled extrusion tension on the mandrel cable plus the "whatever it takes" air pressure of the pump 44.

As the resistance to movement decreases to a value approaching that provided by the mandrel cable, a third force is desirably introduced to replace the diminishing frictional resistance to movement so that the speed of the mandrel remains under control and so that the proper tension is maintained on the cable to produce proper extrusion of the lining material. This third and controllable force is provided by restricting the escape of displaced air ahead of the remaining mortar in the pipeline section, as previously discussed with respect to FIG. 6. Thus, cap 54 is provided on the exit or forward (far) end of the lining run and is fitted with a throttling valve 62 to regulate the rate at which air escapes. Since the initial air pressure at the starting or rear (near) end is regulated by an operator so that its magnitude of pressure is whatever value is required to produce the desired rate of motion, the restriction of escaping air need not exactly coincide with the time when the forward motion of the mandrel must be restrained. It can be started at any time before that time. However, there should be motion control from only one end of the lining run. In the initial stages of the run, control of lining speed will be with the operator of the air pump 44, whereas in the final stages, it will be controlled by the operator of the throttling valve 62 at the exit end of the run. During these final stages, the entrance end of the lining run should be suitably vented as to always have a positive pressure, i.e., so that the gage pressure therein is not less than zero (not a vacuum). It should be noted that, during the initial stages of the lining operation, the rate of forward movement is with an operator stationed at the beginning end while, in the final stages, control is with an operator at the finish end.

Modern steel pipeline manufacture is capable of very close tolerances regarding pipe circumference. However, during handling and laying, this does not necessarily translate into uniform diameter. Thus, pipe in the ground may not be circular in cross-section, particularly the thin-walled pipe used for oil transmission lines. For example, the pipe may be oval in cross-section. The mandrel's flexibility and the guides 34 acting thereon allows it to accommodate changes in cross-sectional shape while maintaining the desired clearance from the pipe wall for the lining thickness desired. Whether the shape assumed is circular or oval, it is desirably non-tapered, i.e., substantially uniform over its length.

During the lining operation, the slug of mortar comprising the reservoir for lining material will be subject to constant churning as the center of the cylinder of mortar tends to move ahead more rapidly than the outer portion which is in contact with the pipe wall. This churning and mixing action will tend to maintain a uniform mortar consistency throughout the supply slug as well as resist the tendency of mortar which is not constantly mixed to stiffen. Air bubbles or pockets which might be introduced in the initial loading of the pipe will gravitate forwardly to a condition of lower pressure so that the mortar being extruded at the mandrel will be free of air pockets which could otherwise cause defects in the extruded lining.

The process of the present invention is provided not only to achieve a high quality uniform lining but to do so rapidly, i.e., to achieve lining speeds on the order of 100 feet or more per minute. Thus, a 5000 foot run may only take about 50 minutes.

Thus, by applying a predetermined constant tension pull on the mandrel for its movement relative to the mortar slug while moving the mandrel and slug forwardly, a lining may be suitably extruded onto a pipeline wall quickly and inexpensively and without the problems of either inadequate extrusion or "blow-by" which have been encountered in prior lining processes.

Although the invention has been described in detail herein, it should be understood that the invention can be embodied otherwise without departing from the principles thereof. For example, other suitable means may be used to apply a constant tension pull to the mandrel, and other suitable means may be used to apply a push to the mortar and the mandrel to overcome resistance to movement thereof. Such other embodiments are meant to come within the scope of the present invention as defined in the appended claims.

What is claimed is:

1. A method of lining a pipeline section with a mortar comprising the steps of: (a) inserting a quantity of the mortar into the pipeline section; (b) inserting a mandrel into the pipeline section behind the mortar; (c) applying a pushing force to the mandrel and the mortar to overcome resistance to movement thereof; (d) applying a pull to the mandrel; and (e) regulating tension of the pull to maintain a constant tension pull on the mandrel to effect movement of the mandrel at a constant rate relative to a portion of the mortar between the mandrel and a wall of the pipeline section to thereby effect extrusion of the mortar onto an inner wall of the pipeline section to form a lining of mortar on the pipeline section.

2. A method according to claim 1 wherein the step of applying a pull comprises attaching a cable to the mandrel, applying the pull to the cable while winding the cable on a spool, driving the spool with a drive means, measuring a load on the cable, and feeding the measured load back to the drive means so that the drive means is responsive to the measured load for applying the pull to the mandrel.

3. A method according to claim 2 wherein the step of measuring the load on the cable comprises measuring the load on the cable at a location where the cable is attached to the mandrel.

4. A method according to claim 2 wherein the step of applying a pull further comprises measuring the load on the cable at a location outside of the pipeline section, measuring a length of cable wound onto the spool, and feeding the measured cable length back to the drive means.

5. A method according to claim 2 further comprising selecting the drive means to include an eddy current drive means.

6. A method according to claim 1 further comprising observing the lining as applied and adjusting the constant tension pull in response thereto.

7. A method according to claim 1 wherein the step of applying a pushing force comprises applying a fluid pressure to the mandrel and mortar.

8. A method according to claim 1 wherein the step of inserting mortar comprises inserting a quantity of the mortar in excess of a quantity of the mortar required to line the pipeline section in order to maintain a required extrusion pressure throughout a predetermined length of the pipeline section.

9. A method according to claim 1 further comprising restricting escape of air from the pipeline section forward of the mortar during movement of the mortar and mandrel through the pipeline section to apply a pressure on the mortar and mandrel in order to maintain a required extrusion pressure throughout a predetermined length of the pipeline section.

10. A method according to claim 1 wherein the step of inserting mortar comprises providing a flexible membrane enclosure in flow communication with the pipeline section, inserting mortar into the membrane enclosure, and applying pressure in a space between the membrane enclosure and a rigid member thereby collapsing the membrane enclosure to force mortar out of the membrane enclosure and into the pipeline section.

11. A method according to claim 1 further comprising selecting the mandrel to have a substantially uniform shape over its length.

12. A method according to claim 1 where the step of applying a pushing force comprises applying a fluid pressure to the mandrel and mortar, and the step of applying a pull comprises providing a baffle in engagement sealingly with a pipeline wall for movement therealong ahead of the mortar, attaching a cable to the mandrel and the baffle, applying the fluid pressure to the baffle for applying tension to the mandrel, and throttling the fluid pressure applied to the baffle.

* * * * *